United States Patent Office 3,082,215
Patented Mar. 19, 1963

3,082,215
LIN-BENZOBISTHIACHROMONE PIGMENTS
Donald Graham Wilkinson, Manchester, England, assignor to Imperial Chemical Industries Limited, London, England, a corporation of Great Britain
No Drawing. Filed July 22, 1959, Ser. No. 828,728
Claims priority, application Great Britain July 30, 1958
3 Claims. (Cl. 260—328)

This invention relates to new pigments and more particularly it relates to new pigments suitable for the colouration of paints, printing inks, rubber and artificial polymeric materials and for the mass colouration of fibre-forming materials.

The pigments of the invention are of a new polycyclic type which we designate as lin-benzobisthiachromones and in this specification the following system of numbering is used for the parent ring system of these new polycyclic compounds

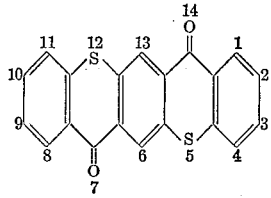

According to the invention we provide new pigments of the formula:

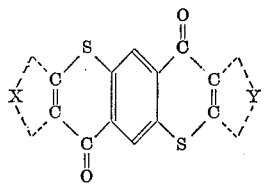

wherein X and Y each represent the atoms necessary to complete a benzene ring or a system of fused 6-, or 6- and 5-membered rings and wherein the rings or ring systems represented by X and Y may carry non-ionic substituents.

As examples of systems of fused rings which may be completed by the atoms represented by X and Y there may be mentioned naphthalene, pyrene and carbazole. Such ring systems must be free from ionic solubilising groups such as sulphonic acid, carboxylic acid and quaternary ammonium groups.

As examples of non-ionic substituents which may be carried by X and Y there may be mentioned halogeno for example chloro and bromo; nitro; alkyl for example methyl and ethyl; substituted alkyl for example trifluoromethyl; aryl for example phenyl and p-tolyl; carbamyl and substituted carbamyl for example N-methylcarbamyl, N:N-dimethylcarbamyl and N-phenylcarbamyl; carbalkoxy for example carbomethoxy; sulphamyl and substituted sulphamyl for example N-methylsulphamyl, N - β - hydroxyethylsulphamyl and N:N - dimethylsulphamyl; amino; alkylamino for example methylamino; dialkylamino for example dimethylamino; arylamino for example anilino; acylamido for example acetylamido, α-furoylamido, p-toluene sulphonamido and aroylamido such as benzoylamido and substituted benzoyl amido (for example o-, m- and p-chloro, -methoxy or -nitro benzoylamido), phthalimido and β-naphthoylamido; alkyl and aryl-ureido and -thioureido for example n-butyl- and phenyl-ureido and -thioureido; arylideneamino for example benzylidineamino; alkanesulphonyl for example methanesulphonyl and chloromethanesulphonyl; hydroxy; alkoxy, for example methoxy, ethoxy and β-hydroxy ethoxy; and aryloxy for example phenoxy and cresoxy. It is to be understood that more than one of these substituents may be present.

As specific examples of the pigments of our invention there may be mentioned lin-benzobisthiachromone, 2:9-dimethyl-lin-benzobisthiachromone, 2:9 - dichloro - 4:11-dimethyl - lin - benzobisthiachromone, 1:3:8:10 - tetrachloro-lin-benzobisthiachromone, 1:4:8:11 - tetramethyl-2:9-dichloro-lin-benzobisthiachromone, 1:2:8:9 - dibenzlin - benzobisthiachromone, 2:9 - dimethoxy-lin-benzobisthiachromone, 3:10 - di(methanesulphonyl)-lin-benzobisthiachromone, 2:9-diamino - lin - benzobisthiachromone, 2:9-diacetylamido - lin - benzobisthiachromone, 2:9-dibenzoylamido-lin-benzobisthiachromone, 2:9 - di(phenylthioureido)-lin-benzobisthiachromone, 2:9 - di(naphthyl-1'-ureido)-lin-benzobisthiachromone, 2:9-di(benzylidineamino)-lin-benzobisthiachromone, 3:10-dibenzoylamido-lin-benzobisthiachromone, 2:9 - di(dimethylamino) - lin-benzobisthiachromone and 2:9 - dibenzoylamido - (3:4: 10:11-dibenz)-lin-benzobisthiachromone.

According to a further feature of the invention we provide a process for the manufacture of new pigments as hereinbefore defined which comprises cyclising a dicarboxylic acid of the formula

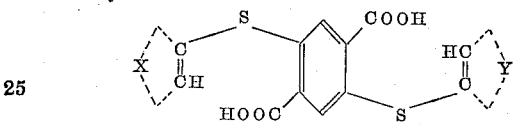

wherein X and Y have the meanings ascribed above by treating said dicarboxylic acid with a dehydrating or condensing agent.

The cyclisation may be carried out for example by heating with dehydrating agents such as sulphuric acid, polyphosphoric acid or chlorosulphonic acid. In carrying out the process of the invention the dicarboxylic acid may, for example, be dissolved in concentrated sulphuric acid and the solution heated for example at between 70° C. and 100° C. for between ½ and 2 hours.

When polyphosphoric acid is used as dehydrating agent it is usually necessary to heat the solution of the dicarboxylic acid at a higher temperature and for a longer time, for example at between 160° C. and 170° C. for 10 hours. When chlorosulphonic acid is used as dehydrating agent it is not usually necessary to heat the solution of the dicarboxylic acid at all, cyclisation being usually complete after stirring for a few minutes at 20° C. or for 1 hour at between —5° and 0° C.

After the cyclisation has taken place the pigment may be precipitated from solution in sulphuric, polyphosphoric or chlorosulphonic acid by pouring the solution into water and it may then be isolated by filtration and washing.

Other dehydrating or condensing agents such as phosphorus tri- and penta-chloride and aluminium chloride may be employed for the cyclisation of the dicarboxylic acid. It is sometimes advantageous to employ a reagent commonly used for the production of acid chlorides, for example thionyl chloride, in conjunction with a condensing agent such as aluminium chloride.

As examples of dicarboxylic acids which may be cyclised in the process of the invention there may be mentioned 2:5-di(phenylmercapto)terephthalic acid, 2:5-di-(p-tolylmercapto)terephthalic acid, 2:5-di(4'-chloro-2'-methyl-phenylmercapto)terephthalic acid, 2:5-di(3':5'-dichlorophenylmercapto)terephthalic acid, 2:5 - di(4'-acetylamidophenylmercapto)terephthalic acid and 2:5-di(naphthyl-2'-mercapto)terephthalic acid.

The dicarboxylic acids used in the process of the invention may be obtained for example by hydrolysis of the corresponding esters with alcoholic potassium hydroxide solution. The esters may be obtained for example by reaction of a 2:5-dihalogenoterephthalic ester with the appropriate thiophenol, thionaphthol or thiol derivative of a carboxylic or heterocyclic compound, by heating if desired in a solvent such as pyridine, for 20 hours in the presence of potassium hydroxide.

Those new pigments as hereinbefore defined in which the rings or ring systems represented by X and Y carry as substituents ureido, thioureido, benzoylamino, or acylamide groups may be manufactured by an alternative process comprising treatment of a pigment as hereinbefore defined in which the rings or ring systems represented by X and Y carry amino groups as substituents, with an isocyanate, isothiocyanate, aldehyde or a functional derivative of an organic acid such as an acid halide, anhydride or ester, and this alternative process forms a further feature of our invention.

The alternative process of our invention may conveniently be carried out by treatment of a finely divided suspension of the amino substituted pigment in a suitable solvent, for example pyridine, with the appropriate reagent, for example n-butylisocyanate, phenyl isothiocyanate, benzaldehyde, benzyl chloride, acetic anhydride, phthalic anhydride, or p-toluene sulphonyl chloride, at an elevated temperature, for example between 100° and 150° C. The product may then be isolated by filtration and washing.

The products obtained by carrying out one of the processes of the invention are usually crystalline in nature and may be converted into a finely divided pigmentary form in known manner, for example by grinding, acid pasting, salt milling or treatment with an organic liquid such as phenol, cresol, xylene or dimethylformamide, if desired at an elevated temperature. In some cases the crystalline form of the pigments of the invention can be modified by the application of such procedures.

The pigments of the invention are useful for incorporation in printing inks, paints, lacquers and stoving enamels and for the colouration of rubber and artificial polymeric materials such as cellulose acetate, polyvinyl chloride, polythene and polystyrene and fibre forming materials such as polyesters and polyamides. They give bright yellow to purple shades of high fastness to light, heat and solvents.

Those pigments of the invention wherein X and Y each represent the atoms necessary to complete a benzene ring which carries one or more halogen atoms as substituents give bright yellow shades of high fastness to light, heat and solvents, and in particular 1:3:8:10-tetrachloro-lin-benzobisthiachromone is a valuable pigment which has very good fastness to out-door atmospheric exposure when incorporated in paints.

Those pigments of the invention wherein X and Y each represent the atoms necessary to complete a benzene ring which carries an acylamino group as a substituent give bright red shades of excellent fastness properties and in particular 2:9-di(4'-chlorobenzoylamido)-lin-benzobisthiachromone is a valuable red pigment of excellent fastness to heat, light and solvents, especially when used for the colouration of artificial polymeric materials such as polythene and polystyrene.

The invention is illustrated but not limited by the following examples in which the parts are by weight.

*Example 1*

3.5 parts of 2:5-di(phenylmercapto)terephthalic acid (which may be made as described below) is added gradually during ½ hour to 30 parts of polyphosphoric acid which is stirred at between 160° and 170° C. and the mixture is then stirred at between 160° and 170° C. for a further 10 hours. The reaction mixture is then added to water, the yellow product in suspension is filtered off, boiled with 250 parts of 5% aqueous caustic soda solution and again filtered and washed to remove uncyclised material. The lin-benzobisthiachromone thus obtained is crystallised from chloronaphthalene when it forms flat golden yellow needle-shaped crystals which melt at from 390° to 395° C. On analysis the product is found to contain 69.1% of carbon, 2.9% of hydrogen and 17.2% of sulphur. $C_{20}H_{10}O_2S_2$ requires carbon 69.3%, hydrogen 2.9% and sulphur 18.5%.

2.5 parts of the product is added gradually to 50 parts of 90% sulphuric acid which is stirred at room temperature and the deep blue-green solution is then stirred for 1 hour. It is then added dropwise to 550 parts of a 10% aqueous solution of sodium carbonate at 65° C., with good stirring. The pigment is then filtered off, washed free from alkali, intimately mixed with 0.12 part of pine oil and finally dried at 50° C. The product forms a bright golden yellow pigment of excellent fastness to heat, light and solvents which can be used for the preparation of paints and lacquers and the colouration of plastics. It can also be used for the mass-colouration of fibre forming materials such as polyesters and polyamides.

The 2:5-di(phenylmercapto)terephthalic acid used in the above example may be obtained as follows:

A mixture of 4.65 parts of diethyl-2:5-dichloroterephthalate, 4.43 parts of thiophenol and 2.28 parts of powdered potassium hydroxide is stirred with 25 parts of dry pyridine under a reflux condenser at between 115° and 120° C. for 20 hours. The reaction mixture is added to water and the pyridine is removed by steam-distillation. The residue in the reaction vessel is then made just acid by the addition of hydrochloric acid and the unreacted thiophenol is steam distilled off. The insoluble yellow solid residue is filtered off and boiled with dilute sodium carbonate solution and the undissolved ester is filtered off, and hydrolysed to form 2:5-di(phenylmercapto)terephthalic acid by boiling it with a 5% solution of potassium hydroxide in ethanol. The 2:5-di(phenylmercapto)terephthalic acid so formed is a bright yellow compound melting at 342–344° C.

*Example 2*

2.6 parts of 2:5-di(p-tolylmercapto)-terephthalic acid (which may be made as described below) is added gradually to 60 parts of 98% sulphuric acid which is stirred at room temperature. The solution is then heated to 70° C. and stirred at this temperature for 1 hour and finally heated to 80° C. and stirred at this temperature for ½ hour. The reaction mixture which is dark green in colour is added gradually to 500 parts of hot 10% aqueous sodium carbonate solution, when a bright golden yellow suspension of 2:9-dimethyl-lin-benzobisthiachromone is formed. The pigment is filtered off, washed free from alkali, dried and recrystallised from chlornaphthalene when it forms bright orange micro plate-shaped crystals which melt at from 370° to 374° C. The crystalline product may be converted into a finely divided pigmentary form as previously described for the product of Example 1.

The 2:5-di(p-tolylmercapto)-terephthalic acid used in the above example may be made as follows:

A mixture of 3 parts of diethyl 2:5-dichloroterephthalate, 3.2 parts of p-thiocresol and 1.45 parts of powdered potassium hydroxide is stirred in 15 parts of dry pyridine under a reflux condenser at between 115° and 120° C. for 20 hours. The diethyl ester of 2:5-di(p-tolylmercapto)-terephthalic acid is isolated and hydrolysed as described in Example 1 for the corresponding diphenyl mercapto compound.

*Example 3*

5 parts of 2:5-di(4'-chloro-2'-methyl-phenylmercapto)-terephthalic acid (which may be described below) is added gradually over 20 minutes to 80 parts of 100% sulphuric acid which is stirred well at between 50° and 60° C. The reaction mixture is then heated to 100° C. and stirred at 100° C. for 1½ hours. The deep green coloured reaction mixture is then added to 500 parts of water and the bulk of the acid is removed by filtration. The yellow pigment is then stirred with dilute aqueous ammonia solution at 70° C., filtered off, washed neutral and dried. The bright yellow pigment so obtained is purified by crystallisation from chlornaphthalene. 2:9-dichloro - 4:11 - dimethyl-lin-benzobisthiachromone is thus obtained in the form of fine yellow needle-shaped crystals which melt with decomposition at from 435° to 440° C.

A mixture of 2 parts of the product and 15 parts of anhydrous sodium carbonate is ball-milled for 20 hours with steel balls. The mixture of sodium carbonate and pigment is separated from the steel balls and stirred with hot water and the pigment is filtered off and washed free from alkali. The pigment paste is stirred with 0.1 part of pine oil and dried at 50° C. A bright yellow powder of soft texture is obtained which is slightly greener in shade than the pigment of Example 1. It has excellent fastness properties.

The starting material used in the above example may be prepared as follows:

A mixture of 21.75 parts of diethyl 2:5-dichloroterephthalate, 29.7 parts of 4-chloro-2-methyl-thiophenol and 10.65 parts of powdered potassium hydroxide is stirred with 120 parts of dry pyridine under a reflux condenser at between 115° and 120° C. for 20 hours. The diethyl ester of 2:5-di(4'-chloro-2'-methylphenylmercapto)-terephthalic acid is isolated and hydrolysed as described in Example 1 for the corresponding diphenyl mercapto compound.

*Example 4*

4.1 parts of 2:5-di(3':5'-dichlorophenylmercapto)-terephthalic acid (which may be made as described below) is added gradually over 30 minutes to 80 parts of 98% sulphuric acid stirring at between 95° C. and 105° C., and the stirring continued for 1 hour at this temperature. The deep green coloured solution is then added to 500 parts of water and the bright yellow precipitate is filtered off. The filter-cake is then stirred with dilute aqueous ammonia at 70° and the purified bright yellow pigment filtered off, washed until free of ammonia and dried. It is then further purified by crystallisation from the chlornaphthalene when 1:3:8:10-tetrachloro-lin-benzobisthiachromone is obtained as fine bright yellow needles which melt above 430° C. The crystalline product is converted into a finely divided pigmentary form as previously described for the pigment of Example 3.

The 2:5-bis(3':5'-dichlorophenylmercapto)-terephthalic acid may be made as follows:

A mixture of 6.0 parts of 3:5-dichlorothiophenol, 4.4 parts of dimethyl-2:5-dichloroterephthalate and 1.9 parts of powdered potassium hydroxide is stirred with 25 parts of pyridine at the boil under a reflux condenser for 20 hours. The product is isolated and hydrolysed as described in Example 1 for the corresponding diphenylmercapto compound.

*Example 5*

3 parts of 2:5-di(3'-chlorophenylmercapto)-terephthalic acid is added gradually during 15 minutes to 45 parts of chlorosulphonic acid which is stirred at between 0° C. and −5° C. The intense green solution is stirred at this temperature for a further 1 hour and is then added slowly to crushed ice. The crude yellow 3:10-dichloro-lin-benzobisthiachromone which is precipitated is filtered off and freed from uncyclised material by extraction with hot 2% aqueous sodium carbonate solution. After drying, it is purified by crystallisation from chloronaphthalene when it is obtained as a bright yellow crystalline powder. The product is converted into a finely divided pigmentary form by milling with sodium carbonate as described for the product of Example 3. When the pigment is incorporated into paints or used for colouring plastics, bright yellow shades of excellent fastness to heat, light and solvents are obtained.

The 2:5-di(3'-chlorophenylmercapto)-terephthalic acid used in this example may be obtained by condensation of dimethyl-2:5-dibromoterephthalate with m-chlorothiophenol followed by hydrolysis of the product, the procedure being similar to that described in Example 1 for obtaining 2:5-diphenylmercaptoterephthalic acid.

*Example 6*

5 parts of 2:5-di(2'-chlorophenylmercapto)-terephthalic acid is stirred with a solution of 16 parts of thionyl chloride in 55 parts of monochlorobenzene for 1 hour at 100° C. in a closed vessel fitted with a reflux condenser. The solution is cooled to room temperature and 10 parts of powdered aluminium chloride is gradually added. The colour changes through purple to green. The reaction mixture is then heated at 130° C. for 3 hours. It is then cooled and the insoluble reaction product is filtered and washed with a little monochlorobenzene and then with alcohol. The product is warmed with dilute hydrochloric acid to free it from aluminium compounds, filtered and then extracted with hot dilute sodium carbonate solution to free it from uncyclised material. After drying it is recrystallised from chlornaphthalene. 4:11-dichloro-lin-benzobisthiachromone is obtained in the form of golden yellow needles. It may be converted into a finely divided pigmentary form as described for the product of Example 3. When the pigment is incorporated into paints or used for the colouration of plastics, bright yellow shades of excellent fastness to heat, light and solvents are obtained.

The 2:5-di(2'-chlorophenylmercapto)-terephthalic acid used in this example may be obtained by a procedure similar to that described in Example 1 for obtaining 2:5-diphenylmercaptoterephthalic acid, thiophenol being replaced by 2-chlorothiophenol.

The following table briefly indicates in column 2 the reagent and conditions used to obtain other lin-benzobisthiachromones from the appropriately substituted 2:5-di-(phenylmercapto) terephthalic acids and in column 4 the shade of each product when converted into a finely divided pigmentary form. The terephthalic acids listed in column 1 may all be obtained by condensation of dimethyl 2:5-dichloro- (or bromo-) terephthalate with the appropriately substituted thiophenol, followed by hydrolysis of the condensate.

| Starting material | Method of cyclisation | Lin-benzobisthiachromone obtained | Colour |
|---|---|---|---|
| 2:5-di(3':5'-dimethylphenylmercapto)terephthalic acid. | 98% sulphuric acid, 2 hours at 100° C. | 1:3:8:10-tetramethyl | Yellow. |
| 2:5-di(4'-chloro-2:5-dimethylphenylmercapto)terephthalic acid. | 100% sulphuric acid, 2 hours at 100° C. | 2:9-dichloro-1:4:8:11-tetramethyl | Do. |
| 2:5-di(4'-chlorophenylmercapto)terephthalic acid. | 98% sulphuric acid, 15 minutes at 100° to 110° C. | 2:9-dichloro | Reddish yellow. |
| 2:5-di(3'-chloro-2-methylphenylmercapto)terephthalic acid. | Chlorosulphonic acid, 1 hour at 0° to −5° C. | 3:10-dichloro-4:11-dimethyl | Greenish yellow. |
| 2:5-di(2':5'-dichlorophenylmercapto)terephthalic acid. | Chlorosulphonic acid, 10 minutes at 20° C. | 1:4:8:11-tetrachloro | Yellow. |
| 2:5-di(2':4'-dichlorophenylmercapto)terephthalic acid. | ----do---- | 2:9:4:11-tetrachloro | Do. |
| 2:5-di(3':4'-dichlorophenylmercapto)terephthalic acid. | ----do---- | 2:3:9:10-tetrachloro | Orange. |
| 2:5-di(4'-methoxyphenylmercapto)terephthalic acid. | Method of Example 6 | 2:9-dimethoxy | Bright yellowish red. |
| 2:5-di(5'-chloro-2-methoxyphenylmercapto)terephthalic acid. | Chlorosulphonic acid, 10 minutes at 20° C. | 1:8-dichloro-4:11-dimethoxy | Orange. |
| 2:5-di(3'-chloro-4-methoxyphenylmercapto)terephthalic acid. | Chlorosulphonic acid, 5 minutes at 15° C. | 3:10-dichloro-2:9-dimethoxy | Do. |
| 2:5-di(3'-methanesulphonylphenylmercapto)terephthalic acid. | 98% sulphuric acid, 1 hour at 100° to 105° C. | 3:10-di(methanesulphonyl) | Bright orange. |

Example 7

In place of the 5 parts of 2:5-di(2'-chlorophenylmercapto)terephthalic acid used in Example 6 there is used 5 parts of 2:5-di(naphthyl-2'-mercapto)terephthalic acid. 1:2:8:9-dibenz-linbenzobisthiachromone is obtained. After conversion to a finely divided pigmentary form it forms a yellow pigment.

2:5-di(naphthyl-2'-mercapto)terephthalic acid may be obtained by condensation of dimethyl 2:5-dibromoterephthalate with naphthalene-2-thiol followed by hydrolysis of the condensate.

Example 8

1.9 parts of 2:9-diamino-lin-benzobisthiachromone are ball-milled for 20 hours with 100 parts of pyridine. The resulting suspension is diluted with 50 parts of pyridine and heated to 100° C. 6 parts of benzoyl chloride are added with stirring to the hot suspension which is then boiled under reflux for 3 hours. The bright orange red suspension of 2:9 - di(benzoylamido) - lin - benzobisthiachromone obtained in this way is cooled and poured with stirring into a mixture of 500 parts of ice and 150 parts of concentrated hydrochloric acid. The orange-red precipitate is filtered off, washed with water until free from acid, and dried. It is continuously extracted for 1 hour with hot acetone and dried. The product may be purified, if desired, by recrystallisation from boiling dimethyl formamide whence it is obtained as copper coloured plates which melt with decomposition above 370° C. Found C, 69.4; H, 3.3; N, 4.7%. $C_{34}H_{20}O_4N_2S_2$ requires C, 70.0; H, 3.4; N, 4.8%.

2 parts of crystalline 2:9-di(benzoylamido)-lin-benzobisthiachromone are ball-milled for 17 hours with 20 parts of anhydrous sodium carbonate. The mixture is extracted with hot water and filtered, the filter cake washed alkali-free with water, mixed intimately with 0.1 part of pine oil and dried at 50° C. The resulting bright mid-shade red pigment has excellent fastness properties especially to heat and solvents when incorporated into paint media.

The 2:9-diaminobenzobisthiachromone used in this example may be obtained as follows:

8.5 parts of 2:5 - di(4' - acetylamidophenylmercapto)-terephthalic acid (which may be made as described below) are added gradually during 10 to 15 minutes with stirring to 170 parts of 98% sulphuric acid without external cooling. The resulting orange solution is heated to between 100° C. and 110° C. during 15 to 20 minutes and is maintained at this temperature for a further 45 minutes. During the heating the colour of the solution changes first to violet and finally to bright blue. The solution is cooled to room temperature and added dropwise to a stirred solution of 350 parts of sodium carbonate in 2000 parts of water. The magenta solid which is thereby precipitated is filtered off, washed free from alkali with hot water and dried at 100° C. If desired, it may be purified by recrystallisation from boiling mono-chloro-naphthalene. Long purple needles are obtained. Found C, 64.2; H, 3.4; N, 7.1%. $C_{20}H_{12}O_2N_2S_2$ requires C, 63.9; H, 3.2; N, 7.4%.

2:5-di(4'-acetylamidophenylmercapto)terephthalic acid may be prepared as follows:

42 parts of p-acetylamidothiophenol are added rapidly to a stirred suspension of 14.4 parts of powdered potassium hydroxide in 350 parts of pyridine at 65° C. in a flask from which the air has been excluded by a current of nitrogen. The mixture is stirred for 15 minutes and then 45.2 parts of diethyl-2:5-dibromoterephthalate and 100 parts of pyridine are added. The mixture is stirred and boiled under reflux in an atmosphere of nitrogen for 16 hours. The resulting thick yellow suspension is poured into 2000 parts of cold water and the insoluble yellow solid is filtered off, washed with water and then with 100 parts of ethanol. It is mixed with 450 parts of 10% aqueous sodium hydroxide solution and 500 parts of 95% ethanol and boiled under reflux for 90 minutes. The resulting colourless solution is diluted with 500 parts of hot water and acidified to Congo red with concentrated hydrochloric acid. The bright yellow precipitate of 2:5-di(4'-acetylamidophenylmercapto)-terephthalic acid is filtered off, washed acid free with boiling water and dried at 100° C.

Example 9

1.9 parts of 2:9-diamino-lin-benzobisthiachromone are ground to a fine paste with 50 parts of pyridine. The resulting suspension is diluted with 100 parts of pyridine and 40 parts are distilled off to remove traces of water. The resulting suspension is cooled to 80° C. and 3.5 parts of p-chlorobenzoyl chloride is added. The mixture is again heated to boiling and is stirred and boiled under reflux for 3 hours during which time the maroon colour of the suspension changes to bright scarlet. The 2:9-di(4'-chlorobenzoylamido) - lin - benzobisthiachromone which is formed is filtered from the hot reaction mixture, and is washed with 25 parts of boiling pyridine. It is then continuously extracted with boiling acetone for 3 hours and finally dried at 100° C.

2 parts of the crystalline product are mixed with 20 parts of sodium chloride, 350 parts of steel balls and 20 parts of nails and milled for 40 hours. The salt-pigment mixture is separated from the steel balls and nails and is stirred with 25 parts of dimethyl formamide for 12 hours, during which time its shade becomes appreciably brighter. The mixture is diluted with 120 parts of hot water, stirred at 70° C. for ½ hour and then filtered. The filter cake is stirred with 150 parts of water and 5 parts of 98% sulphuric acid at 70° C. for ½ hour, filtered, washed acid free with hot water and the moist filter cake is mixed intimately with 0.1 part of pine oil and dried at 60° C.

The resulting bright scarlet pigment when incorporated into paint media and into polymeric materials such as polythene and polystyrene has excellent fastness properties especially to heat and solvents.

If in place of p-chlorobenzyl chloride in the above example there is used a chemically equivalent quantity of other acid chlorides or anhydrides, other 2:9-di-(acylamido)-lin-benzobisthiachromones may be obtained, such as those listed in the following table. The shades of the products, after conversion into a finely divided pigmentary form are listed in column 3.

| Acid chloride or anhydride | Lin-benzobisthiachromone obtained | Shade |
| --- | --- | --- |
| p-Methoxybenzoyl chloride. | 2:9-di(4'-methoxybenzoylamido). | Bright red. |
| Acetic anhydride | 2:9-di(acetylamido) | Orange. |
| Phthalic anhydride | 2:9-di(phthalimido) | Do. |
| p-Toluyl chloride | 2:9-di(4'-methylbenzoylamido). | Bright orange. |
| o-Bromobenzoylchloride. | 2:9-di(2'-bromobenzoylamido). | Do. |
| m-Nitrobenzoylchloride. | 2:9-di(3'-nitrobenzoylamido). | Reddish orange. |
| p-Nitrobenzoylchloride. | 2:9-di(4'-nitrobenzoylamido). | Bright orange-red. |
| α-Furoyl chloride | 2:9-di(α-furoylamido) | Bright orange. |
| p-Dimethylaminobenzoyl chloride. | 2:9-di(4'-dimethylaminobenzoylamido). | Bluish red. |
| β-Naphthoyl chloride | 2:9-di(β-naphthoylamido) | Bright scarlet. |
| 2:4-dichlorobenzoyl-chloride. | 2:9-di(2':4'-dichloro benzoylamido). | Reddish orange. |
| 3:4-dichlorobenzoyl chloride. | 2:9-di(3':4'-dichloro benzoylamido). | Yellowish red. |
| Diphenyl-4-carboxy chloride. | 2:9-di(4'-phenylbenzoylamido). | Do. |
| m-Toluyl chloride | 2:9-di(3'-methylbenzoylamido). | Orange-yellow. |
| p-Toluenesulphonyl chloride. | 2:9-di(4'-methylbenzene sulphonamido). | Red. |

Example 10

In place of 3.5 parts of p-chlorobenzoyl chloride in Example 9 there are used 2.9 parts of phenylisothiocyanate. The 2:9 - di(phenylthioureido)-lin-benzobisthiachromone which is obtained may be converted into a finely divided pigmentary form by the method used for the product of Example 9 and then forms an orange-red pigment.

Example 11

In place of 3.5 parts of p-chlorobenzoyl chloride in Example 9 there are used 2.2 parts of α-naphthylisocyanate. The 2:9-di(naphthyl-1'-ureido)-lin - benzobisthiachromone which is obtained may be converted into a finely divided pigmentary form by the method used for the product of Example 9 and then forms a bright red pigment.

Example 12

In place of 3.5 parts of p-chlorobenzoyl chloride in Example 9 there are used 10 parts of n-butyl isocyanate. The 2:9-di(n-butylureido) - lin - benzobisthiachromone which is obtained may be converted into a finely divided pigmentary form by method used for the product of Example 9 and then forms a bright scarlet pigment.

Example 13

In place of 3.5 parts of p-chlorobenzoyl chloride in Example 9 there are used 2.8 parts of phenylisocyanate. The 2:9-di(phenylureido) - lin - benzobisthiachromone which is obtained may be converted into a finely divided pigmentary form by the method used for the product of Example 9 and then forms an orange-red pigment.

A red modification of this pigment is obtained by dissolving the orange red pigment in cold 98% sulphuric acid and pouring the solution into a large volume of water, filtering off the precipitated solid, washing acid-free and drying. The orange-red and red modifications of this pigment give different X-ray powder photographs and infra-red absorption spectra.

Example 14

16 parts of benzaldehyde are added to a stirred, finely divided suspension of 1.9 parts of 2:9-diaminobenzobisthiachromone in 125 parts of pyridine. The mixture is stirred and boiled under reflux for 8 hours, during which time the suspension changes from violet to orange. The suspension is filtered hot, washed with 20 parts of hot pyridine and is then continuously extracted with boiling acetone for 4 hours. The 2:9-di(benzylidineamino)-lin-benzobisthiachromone which is obtained may be converted into a finely divided pigmentary form by the method used for the product of Example 9 and then forms a bright orange pigment.

Example 15

3.2 parts of benzoyl chloride are added to a suspension of 2 parts of finely ground 3:10-diamino-lin-benzobisthiachromone in 100 parts of pyridine, and the mixture is stirred and refluxed for 3 hours. The resulting orange suspension is filtered while still hot, washed with 20 parts of hot pyridine and is then continuously extracted with boiling acetone for 3 hours and dried at 100° C. The 3:10-bis(benzoylamido)-lin-benzobisthiachromone so obtained may, if desired, be crystallised from boiling monochloronaphthalene, orange micro needles being obtained. Found N=4.6%; $C_{34}H_{20}O_4N_2S_2$ requires N=4.8%.

The product may be converted into a finely divided pigmentary form by the method used for the product of Example 9 and then forms an orange pigment.

3:10-diamino-lin-benzobisthiachromone may be prepared in an exactly analogous way to the 2:9 isomer described in Example 8 by using 2:5-di(3'-acetylamidophenylmercapto)terephthalic acid (from dimethyl 2:5-dibromoterephthalic and m-acetylamidothiophenol) in place of 2:5 - di(4' - acetylamidophenylmercapto)terephthalic acid.

Example 16

3 parts of 2:5-di(4'-dimethylaminophenylmercapto) terephthalic acid is added gradually with stirring to 55 parts of 98% sulphuric acid at room temperature. The mixture is heated to 110° C. and stirred at that temperature for 1 hour. The solution is then cooled and poured with stirring into 500 parts of cold water. Sodium hydroxide solution is added until the liquid is no longer acid to Congo red indicator and the purple precipitate of 2:9-di(dimethylamino)-lin-benzobisthiachromone is filtered off, washed with hot water until washings are neutral and continuously extracted for 2 hours with boiling acetone and dried. If desired the product may be crystallised from chloronaphthalene, violet needles being obtained. It may be converted into a finely divided pigmentary form by the method used for the product of Example 9 and then forms a purple pigment.

2:5 - di(4'-dimethylaminophenylmercapto)terephthalic acid may be obtained as follows:

A mixture of 7.6 parts of diethyl 2:5-dibromoterephthalate, 9.8 parts of S-acetyl-p-dimethylaminothiophenol, 5.1 parts of powdered potassium hydroxide and 25 parts of pyridine is stirred and refluxed for 18 hours. The mixture is poured into water and the pyridine is steam distilled off. The aqueous liquor is then acidified with acetic acid and the mixture is steam distilled for a further short period to remove any p-dimethylaminothiophenol. The aqueous residue is filtered. The filter cake is stirred and boiled under reflux for 2½ hours with a mixture of 180 parts of ethanol and 40 parts of 10% aqueous potassium hydroxide solution.

The solution is diluted with an equal volume of water, filtered and the filtrate is acidified with acetic acid. 2:5-di(4' - dimethylaminophenylmercapto)terephthalic acid separates as an orange precipitate which is filtered off, washed with water and dried at 100° C.

S-acetyl-p-dimethylaminothiophenol may be obtained by reduction of p-p'-bis(dimethylaminophenyl)disulphide (prepared as described in Berichte der Deutsche Chemischen Gesellschaft, volume 19, page 1570) with zinc in a mixture of acetic acid and acetic anhydride. It is a stable crystalline solid of melting point 80° to 83° C.

Example 17

2 parts of the diamino(1:2:8:9-dibenz)-lin-benzobisthiachromone obtained as described below is finely ground in 140 parts pyridine. 40 parts of pyridine are distilled off to remove traces of water, the suspension is cooled to about 80° and 4.0 parts of benzoyl chloride added with stirring. The mixture is boiled under reflux for 4 hours. The resulting yellow suspension is filtered while still hot, the insoluble fraction is washed with hot pyridine, then methanol, and is then continuously extracted for 2 hours with boiling acetone. The yellow brown powder which is obtained may be converted to a finely divided pigmentary form as described for the product of Example 9 and then forms a yellow-brown pigment.

The product has the formula:

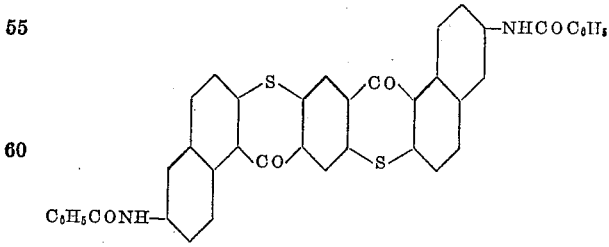

The diamino(1:2:8:9-dibenz) - lin - benzobisthiachromone used in this example may be obtained as follows:

4 parts of 2:5-di(2'-acetylamidonaphthalene-6'-mercapto)terephthalic acid are added to 40 parts of 98% sulphuric acid with stirring during 20 minutes at room temperature. The orange-brown solution is heated to between 100° and 110° C. and stirred for 80 minutes when it becomes cherry red in colour. It is cooled and poured slowly into a stirred solution of 150 parts of sodium carbonate in 1500 parts of water. The orange precipitate of diamino(1:2:8:9'-dibenz)-lin-benzobisthiachromone is filtered off, washed with hot water until the washings are neutral and colourless, then washed with ethyl alcohol and finally the product is continuously extracted for 2 hours with boiling acetone.

2:5 - di(2' - acetylamidonaphthalene - 6' - mercapto) terephthalic acid is prepared by an analogous process to that described in Example 8 for the preparation of 2:5-di(p-acetylamidophenylmercapto)terephthalic acid, replacing p-acetylamidothiophenol with an equivalent amount of 2-acetylamido-naphthalene-6-thiol.

*Example 18*

In place of 2 parts of the diamino(1:2:8:9-dibenz)-lin-benzobisthiachromone used in Example 17 there is used 2 parts of the isomeric 2:9-diamino-(3:4:10:11-dibenz)-lin-benzobisthiachromone obtained as described below. The product obtained has the formula

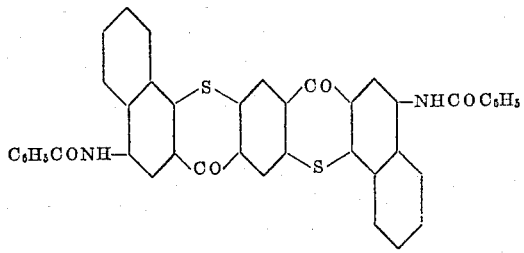

After conversion to a finely divided pigmentary form it forms an orange-brown pigment.

The 2:9-diamino(3:4:10:11-dibenz)-lin-benzobisthiachromone used in this example may be obtained from 2:5 - di(4' - acetylamidonaphthalene - 1'-mercapto)terephthalic acid by treatment with 98% sulphuric acid in the manner described for the preparation of the isomeric compound of Example 17. 2:5-di(4'-acetylamidonaphthalene-4'-mercapto)terephthalic acid may be obtained by an analogous process to that described in Example 8 for the preparation of 2:5-di-(p-acetylamidophenylmercapto)terephthalic acid, replacing p-acetylamidothiophenol with an equivalent amount of 1-acetylaminonaphthalene-4-thiol.

*Example 19*

In place of 2 parts of the diamino(1:2:8:9-dibenz)-lin-benzobisthiachromone used in Example 17 there is used 2 parts of the isomeric diamino(3:4:10:11-dibenz)-lin-benzobisthiachromone obtained as described below. The product has the formula:

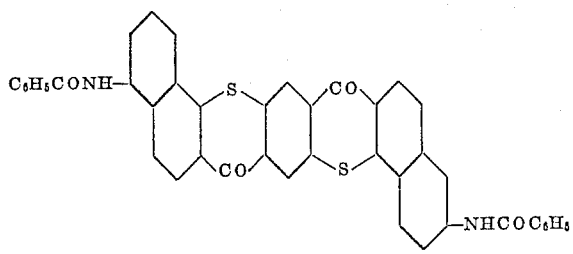

After conversion to a finely divided pigmentary form it forms a yellow pigment.

The diamino(3:4:10:11-dibenz)-lin-benzobisthiachromone used in this example may be obtained from 2:5-di(5' - acetylamido-naphthalene-1'-mercapto)terephthalic acid by treatment with 98% sulphuric acid as described for the preparation of the isomeric compound of Example 17. 2:5-di(5'-acetylamidonaphthalene-1'-mercapto)terephthalic acid may be obtained by an analogous process to that described in Example 8 for the preparation of 2:5-di(p-acetylamidophenylmercapto)terephthalic acid, replacing p-acetylamidothiophenol with an equivalent of 1-acetylamidonaphthalene-5-thiol.

What I claim is:

1. 1:3:8:10-tetrachloro-lin-benzobisthiachromone.
2. 2:9-di(4' - chlorobenzoylamido) - lin - benzobisthiachromone.
3. Pigments of the formula:

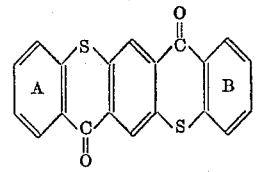

wherein the rings A and B carry non-ionic substituents selected from the group consisting of hydrogen, chlorine, nitro, methyl, methoxy, methane sulfonyl, acetylamido, benzoylamido, chlorobenzoylamido, bromobenzoylamido, nitrobenzoylamido, methoxybenzoylamido, furoylamido, phthalimido, dimethylaminobenzoylamido, naphthoylamido, dimethylbenzoylamido, dichlorobenzoylamido, phenylbenzoylamido, methylbenzoylamido, methylbenzene sulphonamido, phenylthioureido, naphthylureido, butylureido, phenylureido, benzylidineamino, dimethylamino and the divalent substituents.

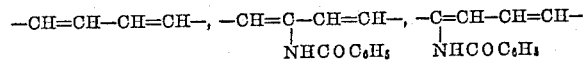

said divalent substituents being attached to two adjacent carbon atoms of the rings A and B.

References Cited in the file of this patent
UNITED STATES PATENTS

| | | |
|---|---|---|
| 1,880,490 | Rosch | Oct. 4, 1932 |
| 2,521,676 | Schmidt-Nickels | Sept. 12, 1950 |

OTHER REFERENCES

Steikopf et al.: Leibigs Annalen, volume 527, pages 244–45 and 262–63 (1937).

Sidgwick: Organic Chemistry of Nitrogen, page 138, page 332, page 337 (1937).

Noller: Textbook of Organic Chemistry (1958), page 366.